United States Patent
Otuka (10) Patent No.: US 8,655,023 B2
(45) Date of Patent: Feb. 18, 2014

(54) ROAD PROFILE DEFINING APPARATUS, ROAD PROFILE DEFINING METHOD, AND ROAD PROFILE DEFINING PROGRAM

(75) Inventor: Kazuyoshi Otuka, Yokohama (JP)

(73) Assignee: Honda elesys Co., Ltd., Yokohama (JP)

( * ) Notice: Subject to any disclaimer, the term of this patent is extended or adjusted under 35 U.S.C. 154(b) by 0 days.

(21) Appl. No.: 13/434,391

(22) Filed: Mar. 29, 2012

(65) Prior Publication Data
US 2012/0263383 A1 Oct. 18, 2012

(30) Foreign Application Priority Data

Mar. 31, 2011 (JP) ................................ P2011-077039

(51) Int. Cl.
*G06K 9/00* (2006.01)
*G06K 9/46* (2006.01)
*G06K 9/66* (2006.01)

(52) U.S. Cl.
USPC ......................................... 382/104; 382/195

(58) Field of Classification Search
None
See application file for complete search history.

(56) References Cited

U.S. PATENT DOCUMENTS

| 2002/0042668 A1* | 4/2002 | Shirato et al. ..................... 701/1 |
| 2002/0042676 A1* | 4/2002 | Furusho ........................ 701/300 |
| 2010/0189306 A1* | 7/2010 | Kageyama et al. ........... 382/104 |

FOREIGN PATENT DOCUMENTS

| JP | 11-085999 A | 3/1999 |
| JP | 2002-366936 A | 12/2002 |
| JP | 2010-040015 A | 2/2010 |

\* cited by examiner

*Primary Examiner* — Utpal Shah
(74) *Attorney, Agent, or Firm* — Arent Fox LLP (57) ABSTRACT

A road profile defining apparatus includes an image acquisition unit configured to acquire an image, a lane marking recognition unit configured to extract from the image a left lane marking located at a left end of one lane painted on a road and a right lane marking located at a right end of the lane, and a road profile determination unit configured to output gradient information indicating a gradient change of the road based on directions of the left and right lane markings.

3 Claims, 10 Drawing Sheets

ROAD PROFILE DEFINING APPARATUS, ROAD PROFILE DEFINING METHOD, AND ROAD PROFILE DEFINING PROGRAM

CROSS-REFERENCE TO RELATED APPLICATIONS

Priority is claimed on Japanese Patent Application No, 2011-77039, filed Mar. 31, 2011, the contents of which are entirely incorporated herein by reference.

BACKGROUND OF THE INVENTION

1. Field of the Invention

The present invention relates to a road profile defining apparatus, a road profile defining method, and a road profile defining program.

2. Background Art

The present invention relates to a road profile defining apparatus, a road profile defining method, and a road profile defining program.

In recent years, in order for a vehicle to travel safely on the road with a gradient, a technique of detecting the situation of the road along which the vehicle is traveling has been proposed. Using this technique, as a situation of the road, gradient information indicating whether the road is uphill or downhill is detected.

For example, in a road information extraction method disclosed in JP-A-2002-366936 (Patent Document 1), a target object is detected from an image acquired by a camera mounted in a vehicle, and a horizontal estimation distance to the detected target object is calculated. Then, the vertical azimuth at which the target object is located on the circumference and the radius of curvature of the circumference is calculated, and the actual distance to the target object is calculated based on the radius of curvature and the vertical azimuth which have been calculated.

In addition, a road shape detection apparatus disclosed in JP-A-2010-40015 (Patent Document 2) includes lane marking extraction means for extracting image portions of the left and right lane markings, which separate the lane of a vehicle, from an image in front of the vehicle captured by a camera and road shape detection means thr calculating, for the image portions of the lane markings, a tangential line in a place within a predetermined range from a place whose position on corresponding real space is closest to the vehicle and detecting the gradient of the lane of the vehicle based on a deviation between each image portion of the lane markings in the Y-axis direction equivalent to the travel direction of the vehicle and the tangential line.

SUMMARY OF THE INVENTION

In both the road information extraction method disclosed in Patent Document 1 and the road shape detection apparatus disclosed in Patent Document 2, however, the gradient is detected using a curve based on a captured image. For this reason, there has been a problem in that the gradient of the road cannot be detected correctly if the curve and the travel direction of the vehicle do not satisfy the positional relationship (for example, the travel direction is a straight-ahead direction) set in advance. The present invention has been made in view of the above points, and it is an object of the present invention to provide a road profile defining apparatus, a road profile defining method, and a road profile defining program capable of detecting the gradient information of the road correctly.

A first aspect of the present invention is a road profile defining apparatus including: an image acquisition configured to acquire an image; a lane marking recognition based on extracts, from the image, a left lane marking located at a left end of one lane painted on a road and a right lane marking located at a right end of the lane; and a road profile determination configured to output gradient information indicating a gradient change of the road based on directions of the left and right lane markings.

In the road profile defining apparatus described above, the road profile determination unit may output the gradient information based on the amount of change in a direction of the left lane marking and the amount of change in a direction of the right lane marking according to a distance from a vehicle.

A second aspect of the present invention is a road profile defining method in a road profile defining apparatus including an image acquisition configured to acquire an image. The road profile defining method includes: a step of extracting from the image a left lane marking located at a left end of one lane painted on a road and a right lane marking located at a right end of the lane; and a step of outputting gradient information indicating a gradient change of the road based on directions of the left and right lane markings.

A third aspect of the present invention is a road profile defining program causing a computer in a road profile defining apparatus including an image acquisition configured to acquire an image to execute: a step of extracting from the image a left lane marking located at a left end of one lane painted on a road and a right lane marking located at a right end of the lane; and a step of outputting gradient information indicating a gradient change of the road based on directions of the left and right lane markings.

According to the present invention, gradient information of the road can be detected correctly.

DETAILED DESCRIPTION OF THE INVENTION

Hereinafter, an embodiment of the present invention will be described with reference to the drawings.

Figure 1:
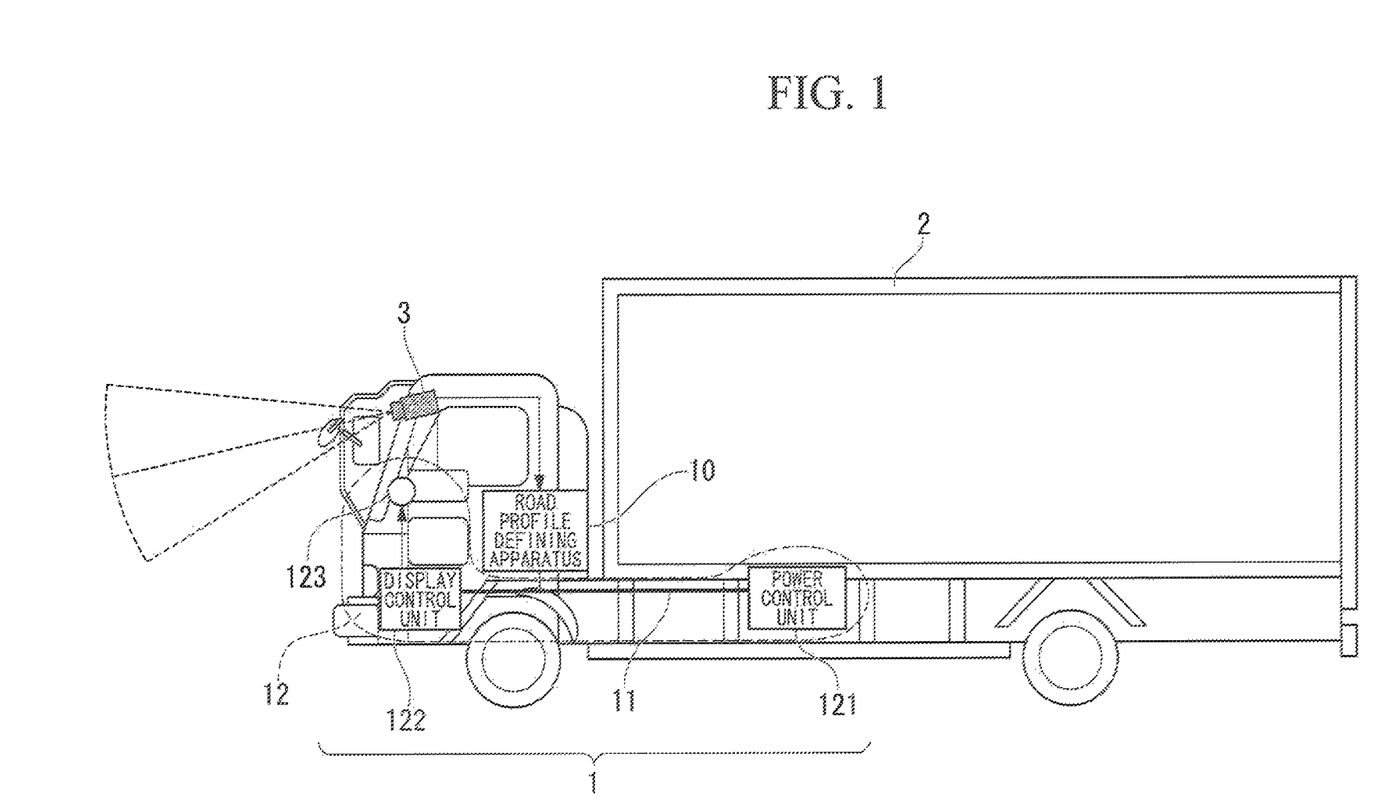
FIG. 1 is a conceptual diagram showing a driving assistance system 1 related to an embodiment of the present invention.

FIG. 1 is a conceptual diagram showing a driving assistance system 1 related to the present embodiment.

In FIG. 1, the driving assistance system 1 is configured to include a front monitoring camera 3, a road profile defining apparatus 10, a vehicle CAN (Controller Area Network) bus 11, and a driving assistance control unit 12.

The driving assistance system 1 is a system which is mounted in a vehicle 2 in order to assist an operation of the vehicle 2, for example, a brake operation and an accelerator operation in a slope.

The front monitoring camera 3 is fixed to the top center of the windshield, and the field of view which is a range where an image can be acquired is directed to the front of the vehicle 2. In FIG. 1, the field of view (in side view) of the front monitoring camera 3 is shown by the broken line. The front monitoring camera 3 (image acquisition unit) acquires an image signal showing an image of a subject and outputs the acquired image signal to the road profile defining apparatus 10.

Figure 7:
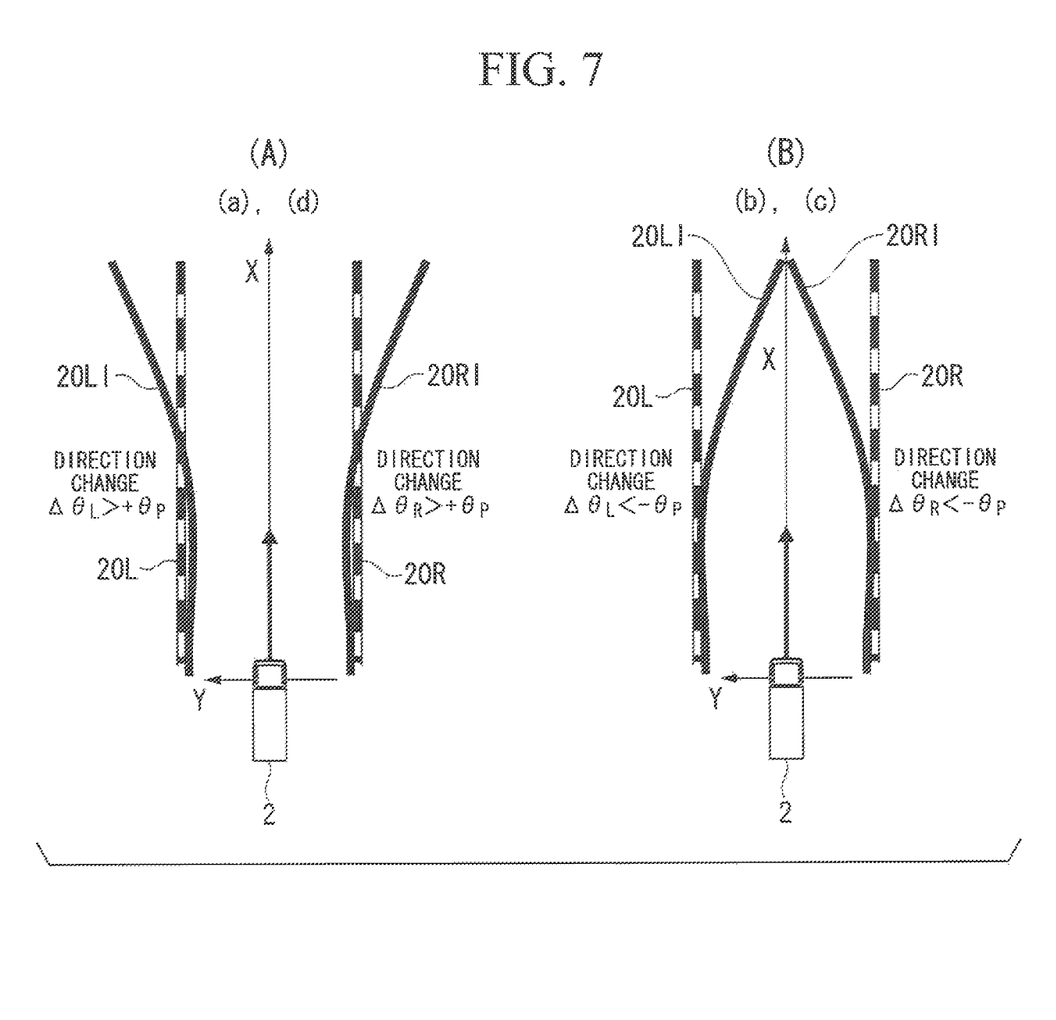
FIG. 7 is a conceptual diagram showing an example of a captured image.
Figure 9:
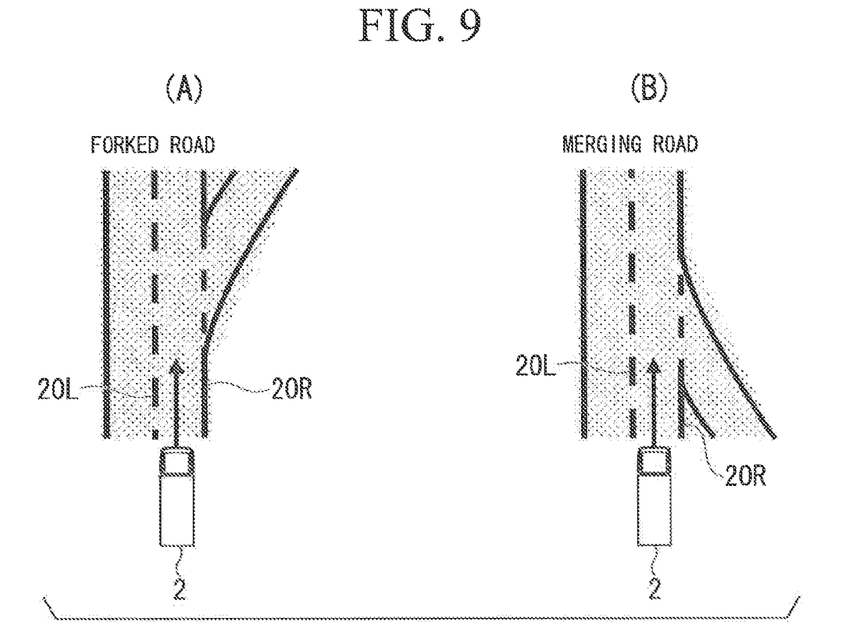
FIG. 9 is a conceptual diagram showing examples of a forked road and a merging road.
Figure 10:
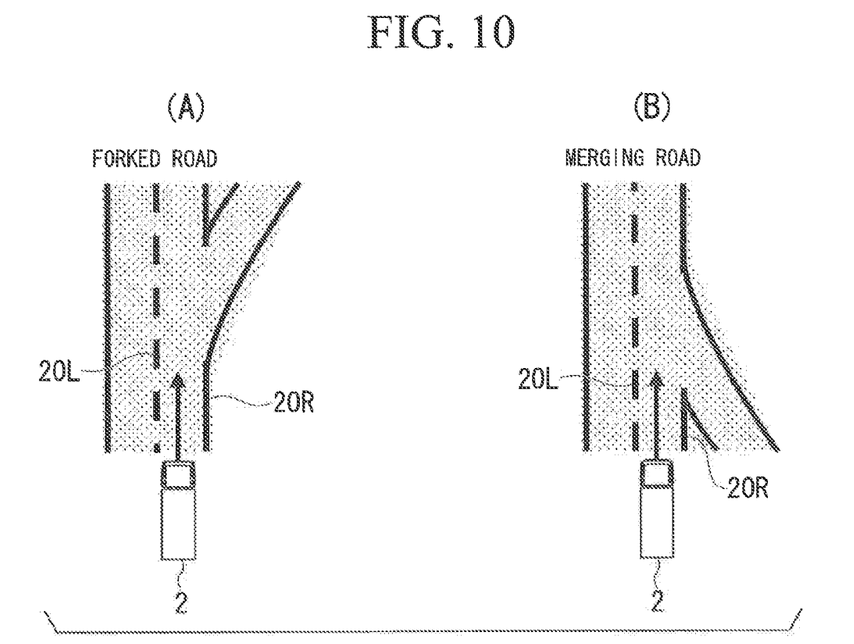
FIG. 10 is a conceptual diagram showing other examples of the forked road and the merging road.

The road profile defining apparatus 10 detects lane markings (so-called white lines; refer to reference symbols 20L and 20R in FIGS. 7, 9, and 10), which are painted on the road at both sides and are located at both the left and right ends of one lane (including a vehicle traffic zone in the present embodiment) along which the vehicle 2 travels, based on the image signal input from the front monitoring camera 3. In the present embodiment, the lane markings include a lane boundary which separates adjacent lanes with the same travel direction from each other, the centerline which separates the adjacent lanes with opposite travel directions from each other, and vehicle traffic zone boundaries located at both the left and right ends of a single lane.

The road profile defining apparatus 10 calculates the directions of the lane markings, which are detected near and distant from the front monitoring camera 3, for each of the left and right sides. The road profile defining apparatus 10 calculates the amounts of change in the lane markings of the near and distant places calculated for each of the left and right sides and outputs the gradient information indicating a gradient change of the road based on the calculated amounts of change. The road profile defining apparatus 10 outputs the determined gradient information to the vehicle CAN bus 11. The configuration of the road profile defining apparatus 10 will be described later.

The vehicle CAN bus 11 receives the gradient information from the road profile defining apparatus 10 and outputs the input gradient information to a driving control assistance unit 12.

The driving control assistance unit 12 performs an operation or processing, which is related to the driving assistance for the driver, based on the gradient information input from the vehicle CAN bus 11. For example, the driving control assistance unit 12 is configured to include a power control unit 121, a display control unit 122, and a display unit 123.

When the gradient information input from the vehicle CAN bus 11 indicates that the gradient change of the road is positive (for example, from a flat area to uphill or from downhill to a flat area), the power control unit 121 gives larger power than the current power to the power mechanism of the vehicle 2. When the gradient information input from the vehicle CAN bus 11 indicates that the gradient change of the road is negative (for example, from a flat area to downhill or from uphill to a flat area), the power control unit 121 gives less power than the current power to the power mechanism of the vehicle 2.

When the gradient information input from the vehicle CAN bus 11 indicates that the gradient change of the road is positive, the display control unit 122 generates a signal indicating that the gradient change of the road is positive (for example, a sound signal showing the warning sound or an image signal for warning display) so that the driver can recognize it, and outputs the generated signal to the display unit 123. When the gradient information input from the vehicle CAN bus 11 indicates that the gradient change of the road is negative, the display control unit 122 generates a signal indicating that the gradient change of the road is negative so that the driver can recognize it, and outputs the generated signal to the display unit 123.

The display unit 123 presents the driving assistance information (for example, warning sound or warning display) to the driver based on the signal input from the display control unit 122.

Next, the configuration of the road profile defining apparatus 10 related to the present embodiment will be described.

Figure 2:
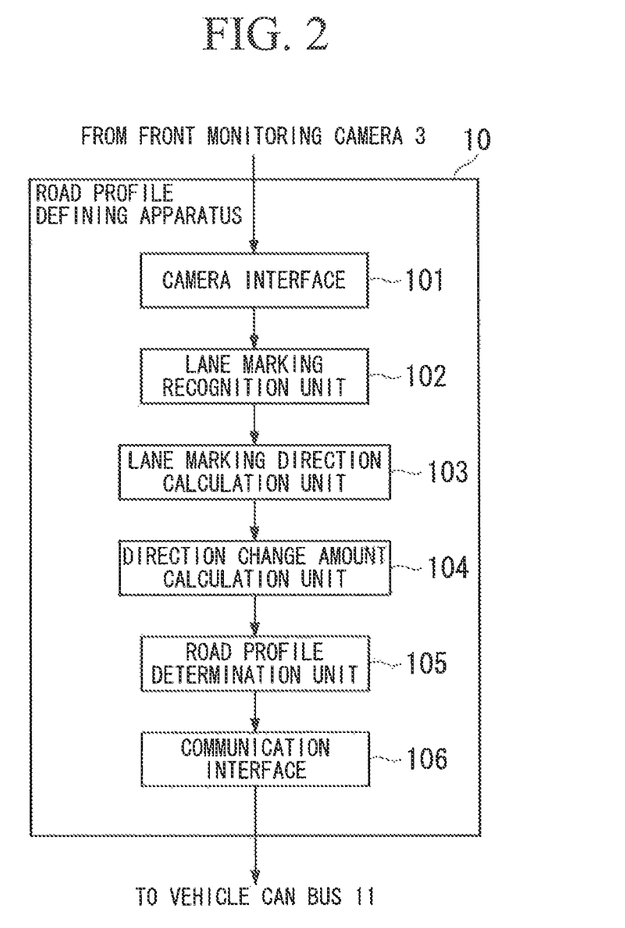
FIG. 2 is a schematic diagram showing the configuration of a road profile defining apparatus 10 related to the present embodiment.

FIG. 2 is a schematic diagram showing the configuration of the road profile defining apparatus 10 related to the present embodiment.

The road profile defining apparatus 10 is configured to include a camera interface 101, a lane marking recognition unit 102, a lane marking direction calculation unit 103, a direction change amount calculation unit 104, a road profile determination unit 105, and a communication interface 106.

The camera interface 101 outputs to the lane marking recognition unit 102 an image signal input from the front monitoring camera 3.

The lane marking recognition unit 102 recognizes lane markings which separate a lane along which the vehicle 2 is traveling, from the image signal input from the camera interface 101.

Accordingly, when the vehicle 2 moves straight in one lane, the lane marking recognition unit 102 extracts dot sequences, which form the recognized lane markings, from both the left and right sides of the vehicle 2 in the travel direction thereof.

In order to recognize the lane markings from the image signal, the lane marking recognition unit 102 uses processing when a white line detection device for a vehicle disclosed in JP-A-11-85999 detects white lines, for example.

Next, processing when the lane marking recognition unit 102 recognizes lane markings will be described.

Figure 3:
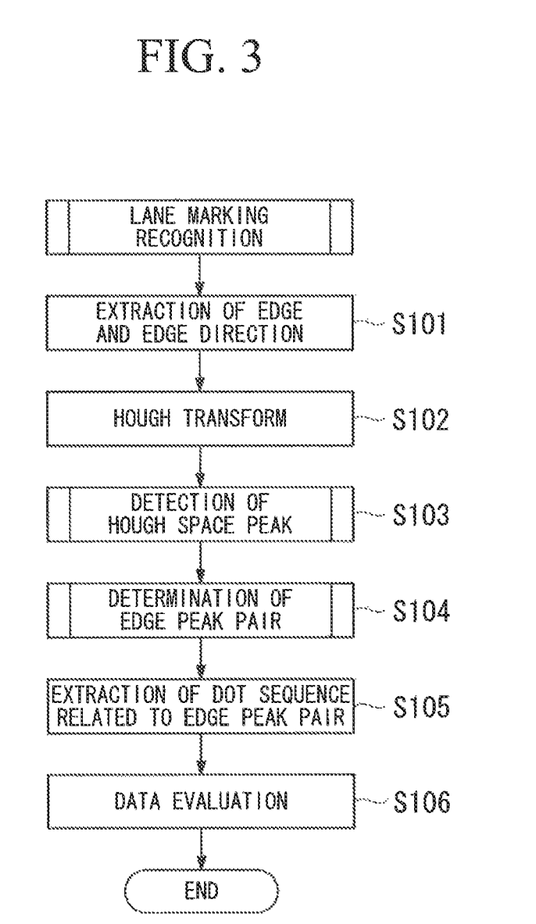
FIG. 3 is a flowchart showing the processing when a lane marking recognition unit 102 related to the present embodiment recognizes lane markings.

FIG. 3 is a flowchart showing the processing when the lane marking recognition unit 102 related to the present embodiment recognizes lane markings.

(Step S101) The lane marking recognition unit 102 detects an edge point from an input image signal. The input image signal is configured to show an image of one frame including the brightness value indicating the size of the brightness of each pixel. The lane marking recognition unit 102 recognizes a pixel, at which the difference (brightness value difference) between the brightness value of this pixel and the brightness value of a pixel adjacent to the pixel in the positive direction is larger than a positive threshold value set in advance, as a positive edge point, and detects a pixel, at which the brightness value difference is smaller than the negative threshold value set in advance, as a negative edge point. Hereinafter, the positive edge point and the negative edge point are simply called edge points when they are not distinguished from each other.

The lane marking recognition unit 102 detects an edge direction, which is a direction in which the edge is spatially inclined, for the determined positive edge point based on the brightness value difference in the horizontal direction and the brightness value difference in the vertical direction. The lane marking recognition unit 102 detects an edge direction similarly for the negative edge point. Then, the process proceeds to step S102.

(Step S102) The lane marking recognition unit 102 performs a Hough transform for each of the detected positive and negative edge points to calculate the number in each Hough space (ρ, θ). Here, ρ indicates a length, and θ indicates an angle. For each edge point in the Hough transform, the lane marking recognition unit 102 calculates the length ρ at each angle θ using Equation (1).

$$\rho = x \cos\theta + y \sin\theta \quad (1)$$

in Equation (1), x indicates a coordinate value of an edge point in the horizontal direction, and y indicates a coordinate value of an edge point in the vertical direction.

Here, the lane marking recognition unit 102 calculates the length ρ at each angle θ, which changes at distances of Δθ, within a range (for example, 15°) set in advance with the edge direction as its center, and counts the number of pixels (casting value) corresponding to a set of the angle θ and the length ρ for each of the positive and negative edge points.

Then, the process proceeds to step S103.

(Step S103) The lane marking recognition unit 102 detects a peak of the casting value of pixels for each of the positive and negative edge points.

Here, processing when the lane marking recognition unit 102 detects a peak will be described.

Figure 4:
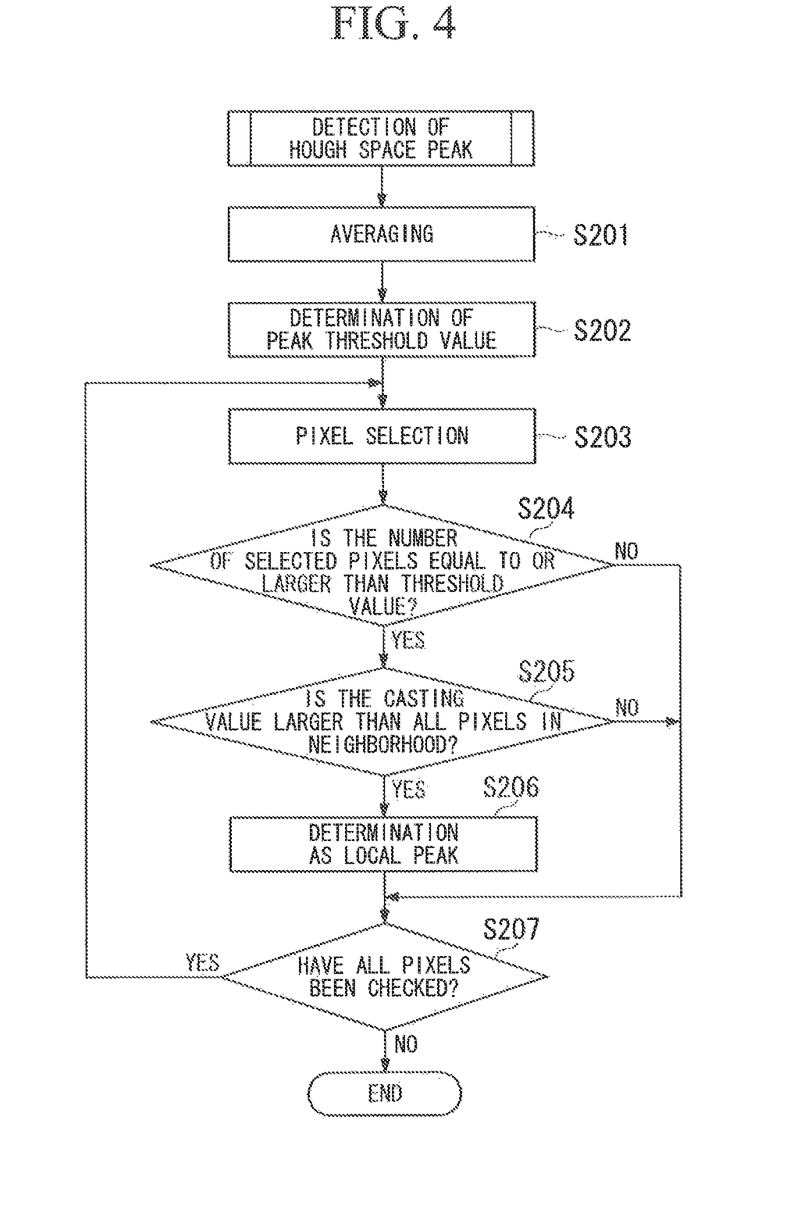
FIG. 4 is a flowchart showing the peak detection processing performed by the lane marking recognition unit 102 related to the present embodiment.

FIG. 4 is a flowchart showing the peak detection processing performed by the lane marking recognition unit 102 related to the present embodiment.

(Step S201) The lane marking recognition unit 102 calculates the average value of the counted casting values of pixels. Then, the process proceeds to step S202.

(Step S202) The lane marking recognition unit 102 sets a threshold value (peak threshold value) for detecting the peak for each of a left region, which is a region of the left half of an image, and a right region, which is a region of the right half of the image. Here, the lane marking recognition unit 102 counts the casting value of pixels based on the positive edge point or the negative edge point included in each region. The lane marking recognition unit 102 sets the peak threshold value such that a predetermined number of pixels (for example, 10 pixels) are selected in descending order from the maximum casting value counted. Then, the process proceeds to step S203.

(Step S203) The lane marking recognition unit 102 selects target pixels. Here, the lane marking recognition unit 102 can improve the efficiency of the processing by selecting target pixels from the (ρ, θ) space in a range set in advance from the curve $\rho = x_0 \cos\theta + y_0 \sin\theta$ corresponding to the infinite point $(x_0, y_0)$ on an image, for example. Then, the process proceeds to step S204.

(Step S204) The lane marking recognition unit 102 determines whether the casting value of target pixels is equal to or larger than the set peak threshold value. When the lane marking recognition unit 102 determines that the casting number of target pixels is equal to or larger than the set peak threshold value ("Yes" in step S204), the process proceeds to step S205. When the lane marking recognition unit 102 determines that the casting value of target pixels is smaller than the set peak threshold value ("No" in step S204), the process proceeds to step S207.

(Step S205) The lane marking recognition unit 102 determines whether or not the casting number of target pixels is larger than the casting number of all pixels within (near) a range set in advance from the target pixels. When the lane marking recognition unit 102 determines that the casting number of target pixels is larger than the casting number of all the near pixels ("Yes" in step S205), the process proceeds to step S206. When the lane marking recognition unit 102 determines that the casting number of target pixels is not larger than the casting number of all the near pixels ("No" in step S205), the process proceeds to step S207.

(Step S206) The lane marking recognition unit 102 sets the target pixels as the peak of the edge point. Then, the process proceeds to step S207.

(Step S207) The lane marking recognition unit 102 determines whether or not the processing has been performed for all pixels in each of the left and right regions of the image. The process ends when the lane marking recognition unit 102 determines that the processing has been performed for all pixels ("Yes" in step S207). When the lane marking recognition unit 102 determines that the processing has not been performed for all pixels ("No" in step S207), the process proceeds to step S203.

After returning to FIG. 3, the process proceeds to step S104.

(Step S104) The lane marking recognition unit 102 sets a pair (edge peak pair) of one of the detected peaks of the positive edge points and one of the detected peaks of the negative edge points.

Here, processing when the lane marking recognition unit 102 sets an edge peak pair will be described.

Figure 5:
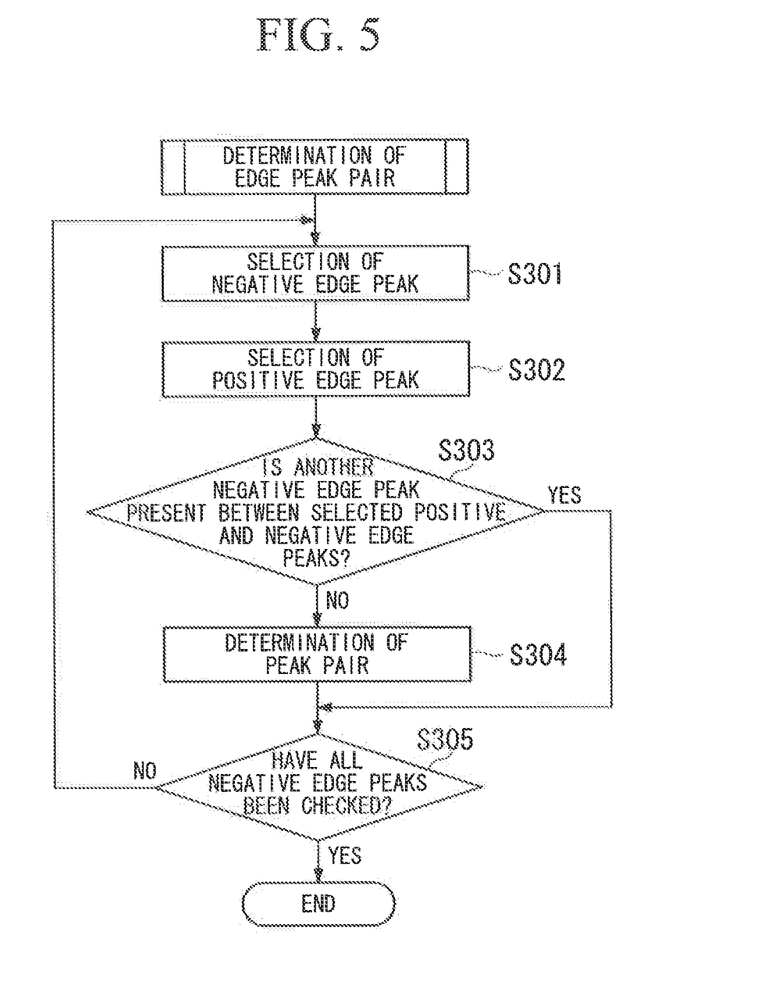
FIG. 5 is a flowchart showing the processing when the lane marking recognition unit 102 related to the present embodiment determines an edge peak pair.

FIG. 5 is a flowchart showing the processing when the lane marking recognition unit 102 related to the present embodiment determines an edge peak pair.

(Step S301) The lane marking recognition unit 102 selects one of the peaks of the negative edge points set in step S103 as a negative edge peak candidate (peak 1). Then, the process proceeds to step S302.

(Step S302) The lane marking recognition unit 102 selects a peak of the positive edge point, which is in a region set in advance from the selected negative edge peak candidate and is closest to the negative edge peak candidate, as a positive edge peak candidate (peak 2). Then, the process proceeds to step S303.

(Step S303) The lane marking recognition unit 102 determines whether or not there is a peak of another negative edge point between the peak 1 and the peak 2. When the lane marking recognition unit 102 determines that there is a peak of another negative edge point ("Yes" in step S303), the process proceeds to step S305. When the lane marking recognition unit 102 determines that there is no peak of another negative edge point ("No" in step S303), the process proceeds to step S304.

(Step S304) The lane marking recognition unit 102 sets the peak 1 and the peak 2 as an edge peak pair. Then, the process proceeds to step S305.

(Step S305) The lane marking recognition unit 102 determines whether or not the processing has been performed for all peaks of the negative edge points set in step S103. When the lane marking recognition unit 102 determines that the processing has been performed for all peaks of the negative edge points set in step S103 ("Yes" in step S305), the process ends. When the lane marking recognition unit 102 determines that the processing has not been performed for all peaks of the negative edge points set in step S103 ("No" in step S305), the process proceeds to step S301.

After returning to FIG. 3, the process proceeds to step S105, (Step S105) The lane marking recognition unit 102 extracts dot sequences, which are corresponding pixels, for each of the positive and negative edge points related to the edge peak pair set in step S104. Then, the process proceeds to step S106.

(Step S106) The lane marking recognition unit 102 determines whether or not the extracted dot sequences are appropriate based on the extracted dot sequences and dot sequences calculated in the past. For example, the lane marking recognition unit 102 calculates a correlation value between the extracted dot sequences and the dot sequences calculated in the past, and determines whether or not the extracted dot sequences are present in both the left and right regions of the screen. In this case, when it is determined that the extracted dot sequences are present in both the left and right regions of the screen since the calculated correlation value is larger than the threshold value set in advance, the lane marking recognition unit 102 determines that the extracted dot sequences are appropriate and recognizes the dot sequences as lane markings. Then, the process of recognizing the lane markings ends.

Returning to FIG. 2, the lane marking recognition unit 102 outputs the dot sequences, which form the recognized lane markings, to the lane marking direction calculation unit 103.

The lane marking direction calculation unit 103 calculates the directions of distant and near portions of the lane markings for each of the left and right regions of the screen among the dot sequences forming the lane markings which have been input from the lane marking recognition unit 102. The distant portion refers to a region where the position of a lane marking shown on an image is farther than the threshold value (for example, 25 m) of the distance from the front monitoring camera 3 set in advance. The near portion refers to a region where the position of the lane marking shown on the image is closer than the threshold value (for example, 25 m) of the distance from the front monitoring camera 3 set in advance. This threshold value of the distance is matched with the coordinate value of the image based on the position where the optical system of the front monitoring camera 3 is placed and the direction of the optical axis (refer to Equation (2)).

The lane marking direction calculation unit 103 converts the coordinates $(f, Px_s, Py_s, 1)^T$ (expressed in the camera coordinate system) of each input dot sequence to the coordinates $(x_1, y_1, 0, 1)^T$ expressed in the world coordinate system by multiplying the coordinates $(f, Px_s, Py_s, 1)^T$ by the coordinate transformation matrix T shown in Equation (2), for example, before the direction of the lane marking is calculated.

$$T = \begin{pmatrix} -Z_c & 0 & X_c & 0 \\ 0 & -Z_c & Y_c & 0 \\ 0 & 0 & 0 & 0 \\ 0 & 0 & 1 & -Z_c \end{pmatrix} \begin{pmatrix} 1 & 0 & 0 & X_c \\ 0 & 1 & 0 & Y_c \\ 0 & 0 & 1 & Z_c \\ 0 & 0 & 0 & 1 \end{pmatrix} \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix} \quad (2)$$

$$\begin{pmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{pmatrix} \begin{pmatrix} \cos\rho & -\sin\rho & 0 & 0 \\ \sin\rho & \cos\rho & 0 & 0 \\ 0 & 0 & 1 & 0 \\ 0 & 0 & 0 & 1 \end{pmatrix}$$

Here, f is a focal length in the optical system of the front monitoring camera 3. P is a distance between elements of an image receiving element. $(x_s, y_s)$ are the coordinates of each pixel. $x_s$ is a coordinate in the horizontal direction, and $y_s$ is a coordinate in the vertical direction. $(x_1, y_1, 0)$ are the coordinates on the road expressed in the world coordinate system. $x_1$ is a coordinate in the straight-ahead direction of the vehicle 2, and $y_1$ is a coordinate in the left and right direction of the vehicle 2. In addition, 0 (zero) on the third column indicates that the height z of the road is zero.

In addition, $(X_c, Y_c, Z_c)$ are the coordinates in which the optical system of the front monitoring camera 3 is placed. θ is the amount of roll angle deviation of the optical axis of the front monitoring camera 3, that is, a rotation angle around the x axis in the world coordinate system. ϕ is the amount of pitch angle deviation of the optical axis of the front monitoring camera 3, that is, a rotation angle around the y axis in the world coordinate system. ρ is the amount of pan angle deviation of the optical axis of the front monitoring camera 3, that is, a rotation angle around the z axis in the world coordinate system.

The lane marking direction calculation unit 103 sets coefficients a, b, and c by applying the coordinates $(x_1, y_1)$ of each converted dot sequence in the distant and near portions of the lane marking to the quadratic curve $y_1 = ax_1^2 + bx_1 + c$ for each of the left and right regions of the screen. For example, the lane marking direction calculation unit 103 uses a least square method in order to apply the coordinates of each dot sequence to the quadratic curve.

Here, the set coefficient "h" indicates the angle θ from the straight-ahead direction (x axis). Here, the angle θ has a positive value at the front-left side with respect to a left lane marking and has a positive value at the front-right side with respect to a right lane marking. The coefficient c usually indicates the amount of deviation of the vehicle 2 in the y-axis direction from the middle of the vehicle 2. In addition, the coefficient "a" is a value sufficiently close to zero empirically.

Therefore, the lane marking direction calculation unit 103 calculates a direction $\theta_L'$ of a distant portion of the left lane marking located at the left of the vehicle 2 as $\tan^{-1}(-b_L')$ and calculates a direction $\theta_L$ of a near portion of the left lane marking as $\tan^{-1}(-b_L)$. Here, $b_L'$ is the coefficient "b" obtained by application to each dot sequence in the distant place of the left region of the screen. $b_L$ is the coefficient "b" obtained by application to each dot sequence in the vicinity of the left region of the screen.

The lane marking direction calculation unit 103 calculates a direction $\theta_R'$ of a distant portion of the right lane marking located at the right of the vehicle 2 as $\tan^{-1}(b_R')$ and calculates a direction $\theta_R$ of a near portion of the right lane marking as $\tan^{-1}(b_R)$. Here, $b_R'$ is the coefficient "b" obtained by application to each dot sequence in the distant portion of the right region of the screen, "$b_R$" is a coefficient "b" obtained by application to each dot sequence in the vicinity of a right region of the screen.

The lane marking direction calculation unit 103 outputs the direction $\theta_L'$ of the distant portion of the left lane marking, the direction $\theta_L$ of the near portion of the left lane marking, the direction $\theta_R'$ of the distant portion of the right lane marking, and the direction $\theta_R$ of the near portion of the right lane marking, which have been calculated, to the direction change amount calculation unit 104.

The direction change amount calculation unit 104 receives from the lane marking direction calculation unit 103 the direction $\theta_L'$ of the distant portion of the left lane marking, the direction $\theta_L$ of the near portion of the left lane marking, the direction $\theta_R'$ of the distant portion of the right lane marking, and the direction $\theta_R$ of the near portion of the right lane marking. The direction change amount calculation unit 104 calculates a difference between the direction $\theta_L'$ of the distant portion of the left lane marking and the direction $\theta_L$ of the near portion of the left lane marking as the left direction change amount $\Delta\theta_L$. The direction change amount calculation unit 104 calculates a difference between the direction $\theta_R'$ of the distant portion of the right lane marking and the direction $\theta_R$ of the near portion of the right lane marking as the right direction change amount $\Delta\theta_R$.

The direction change amount calculation unit 104 outputs the calculated left direction change amount $\Delta\theta_L$ and the calculated right direction change amount $\Delta\theta_R$ to the road profile determination unit 105.

The road profile determination unit 105 determines the gradient information based on the left direction change amount $\Delta\theta_L$ and the right direction change amount $\Delta\theta_R$ input from the direction change amount calculation unit 104 and outputs the gradient information.

Here, the relationship between the road profile and the direction change amount will be described.

Figure 6:
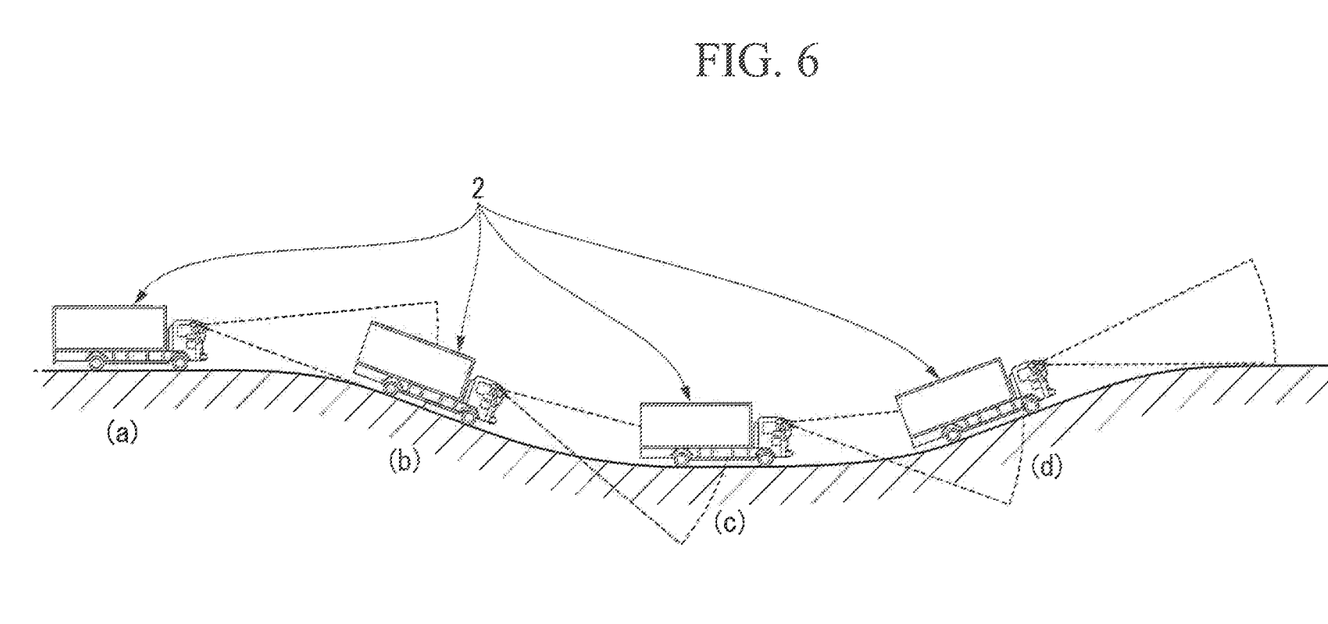
FIG. 6 is a conceptual diagram showing an example of the road profile.

FIG. 6 is a conceptual diagram showing an example of the road profile.

In FIG. 6, the thick line shows a road, and indicates that the vehicle 2 is traveling on the road having a different profile at each time. In addition, the broken line shows the field of view of the front monitoring camera 3.

Reference symbol (a) indicates that the profile of the road, along which the vehicle 2 travels, is to downhill from the flat area with no gradient. Reference symbol (b) indicates that the profile of the road, along which the vehicle 2 travels, is toward the flat area with no gradient from downhill. Reference symbol (c) indicates that the profile of the road, along which the vehicle 2 travels, is to uphill from the flat area with no gradient. Reference symbol (d) indicates that the profile of the road, along which the vehicle 2 travels, is toward the flat area with no gradient from uphill.

FIG. 7 is a conceptual diagram showing an example of a captured image. The x axis indicates a coordinate in the horizontal direction, and the y axis indicates a coordinate in the vertical direction. In addition, thick broken lines on both sides of the vehicle 2 show actual lane markings (left lane marking 20L, and right lane marking 20R).

Part (A) of FIG. 7 shows an example of an image projected on the road under the road profile indicated by the reference symbol (a) or (d) in FIG. 6. In part (A) of FIG. 7, thick solid lines on both sides of the vehicle 2 show lane markings (left lane marking 20LI and right lane marking 20RI) recognized by the lane marking recognition unit 102. In addition, in the same drawing, the directions of the recognized lane markings 20LI and 20RI are almost the same as the travel direction on both the left and right sides of the vehicle 2 in the near portion close to the vehicle 2, but are away from each other toward the travel direction on both the left and right sides of the vehicle 2 in the distant portion which is far from the vehicle 2.

Part (B) of FIG. 7 shows an example of an image projected on the road under the road profile indicated by the reference symbol (b) or (c) in FIG. 6. In part (B) of FIG. 7, thick broken lines on both sides of the vehicle 2 show lane markings (left lane marking 20LI and right lane marking 20RI) recognized by the lane marking recognition unit 102. In addition, in the same drawing, the directions of the recognized lane markings 20LI and 20RI are almost the same as the travel direction on both the left and right sides of the vehicle 2 in the near portion close to the vehicle 2, but are brought closer to each other in the travel direction on both the left and right sides of the vehicle 2 in the distant portion which is far from the vehicle 2.

Therefore, when both the left direction change amount $\Delta\theta_L$ and the right direction change amount $\Delta\theta_R$ are larger than the positive threshold value $\theta_p$ set in advance, the road profile determination unit 105 outputs the gradient information indicating that the gradient change is negative. The negative gradient change includes a road profile change from the flat area to downhill (refer to reference symbol (a) of FIG. 6) and a road profile change from uphill to the flat area (refer to reference symbol (d) of FIG. 6).

When both the left direction change amount $\Delta\theta_L$ and the right direction change amount $\Delta\theta_R$ are smaller than the negative threshold value $-\theta_p$ set in advance, the road profile determination unit 105 outputs the gradient information indicating that the gradient change is positive. The positive gradient change includes a road profile change from downhill to the flat area (refer to reference symbol (b) of FIG. 6) and a road profile change from the flat area to uphill (refer to reference symbol (c) of FIG. 6).

In addition, when both the left direction change amount $\Delta\theta_L$ and the right direction change amount $\Delta\theta_R$ are not larger than the threshold value $\theta_p$ and not smaller than the threshold value $-\theta_p$, the road profile determination unit 105 outputs the gradient information indicating that the road profile is in other conditions. Examples of other conditions include a case where there is no gradient change since the road is a flat area and a case where no lane has been recognized on both sides of the vehicle 2.

The road profile determination unit 105 uses a positive real value set in advance as the threshold value $\theta_p$ and a negative real value set in advance as the threshold value $-\theta_p$. This is to avoid the road profile determination unit 105 erroneously detecting direction changes of the recognized lane markings, which are caused by pitching that is a phenomena in which the vehicle 2 vibrates in the vertical direction, as changes of gradient information.

Here, the direction changes of the lane markings recognized when pitching occurs will be described.

Figure 8:
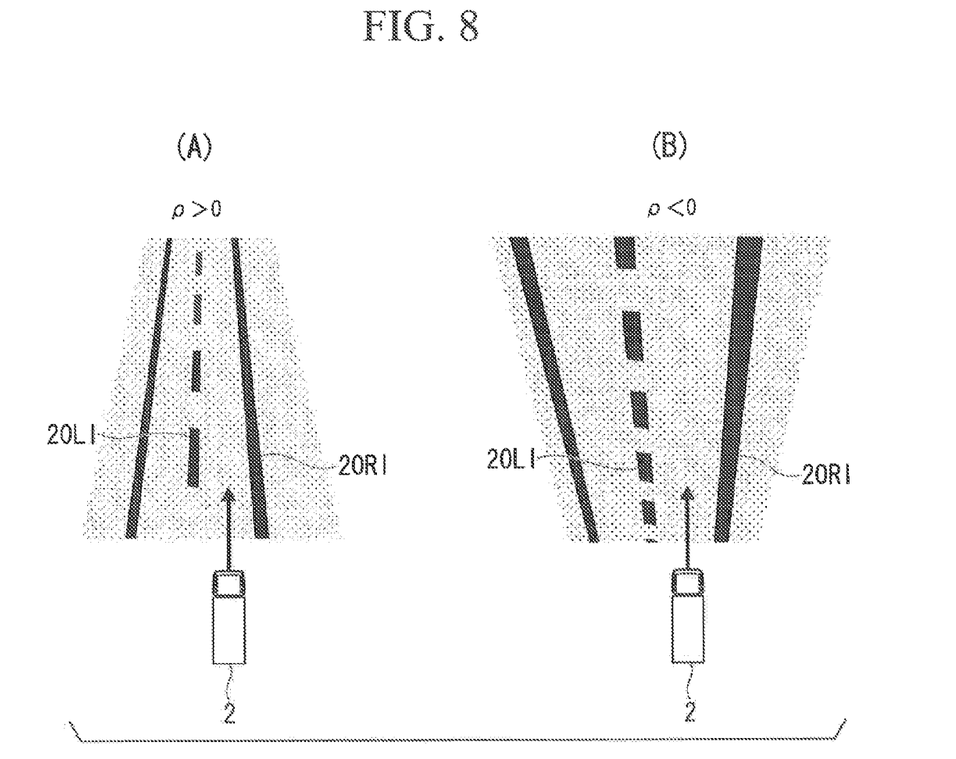
FIG. 8 is a conceptual diagram showing examples of lane markings recognized when pitching occurs.

FIG. 8 is a conceptual diagram showing examples of lane markings recognized when pitching occurs.

Part (A) of FIG. 8 shows lane markings (left lane marking 20LI and right lane marking 20RI) recognized when the vehicle 2 traveling along the flat area is raised by the angle ρ (ρ is a positive value larger than zero) from the horizontal plane due to pitching. From the vehicle 2, the road is viewed as though the road is downhill. Accordingly, the lane markings (left lane marking 20LI and right lane marking 20RI) on both the left and right sides of the vehicle 2 are brought closer to each other toward the travel direction.

Part (B) of FIG. 8 shows Jane markings (left lane marking 20LI and right lane marking 20RI) recognized when the vehicle 2 traveling along the fiat area overlooks it by the angle ρ (ρ is a negative value) from the horizontal plane due to pitching. From the vehicle 2, the road is viewed as though the road is uphill. Accordingly, the lane markings (left lane marking 20LI and right lane marking 20RI) on both the left and right sides of the vehicle 2 are away from each other toward the travel direction.

However, since the lane markings recognized when pitching occurs become almost straight lines empirically, the left direction change amount $\Delta\theta_L$ and the right direction change amount $\Delta\theta_R$ are smaller than those when the above-described road profile changes.

Therefore, it is preferable that the road profile determination unit 105 use a value, which is larger than the maximum value of the left direction change amount $\Delta\theta_L$ and the right direction change amount $\Delta\theta_R$ caused by pitching, as the threshold value $\theta_{p.}$.

In addition, it is preferable that the road profile determination unit 105 use a value, which is smaller than the minimum value of the left direction change amount $\Delta\theta_L$ and the right direction change amount $\Delta\theta_R$ caused by pitching, as the threshold value $-\theta_p$. Hereinafter, the threshold value $\theta_p$ is called a pitching determination threshold value.

In addition, in the present embodiment, when a certain lane branches off to two lanes like a forked road or in the case of a road profile in which two lanes merge into one lane like a merging road, the road profile determination unit 105 may not determine the road profile correctly in that case, this is because the lane marking recognition unit 102 may not recognize the lane markings on both sides of the front of the vehicle 2.

FIG. 9 is a conceptual diagram showing examples of the forked road and the merging road.

Part (A) of FIG. 9 shows a forked road where one lane branches off to the right in front of the vehicle 2, and the right lane marking 20R is also painted in a portion which is a right side of the front of the lane along which the vehicle 2 is traveling, and in which the lane branches off.

Part (B) of FIG. 9 shows a merging road where one lane merges with another lane on the right side of the front of the vehicle 2, and the right lane marking 20R is also painted in a portion which is a road on the right side of the front of the lane along which the vehicle 2 is traveling, and in which the lanes merge with each other.

Also on such a forked road or a merging road, when the vehicle 2 moves straight, the lane marking recognition unit 102 recognizes the lane markings 20L and 20R on both sides of the front of the vehicle 2. Therefore, the gradient information can be correctly determined by the present embodiment.

FIG. 10 is a conceptual diagram showing other examples of the forked road and the merging road.

Part (A) of FIG. 10 shows a forked road where one lane branches of to the right in front of the vehicle 2, and the right lane marking 20R is cut in a portion which is a right side of the front of the lane along which the vehicle 2 is traveling, and in which the lane branches off.

When the vehicle 2 moves straight on such a forked road, the lane marking recognition unit 102 recognizes the right lane marking 20R at the right side of the front of the vehicle 2. In this case, since the width of the lane seemingly spreads gradually toward the travel direction, the right direction change amount $\Delta\theta_R$ calculated by the direction change amount calculation unit 104 may be larger than the pitching determination threshold value $\theta_p$. For this reason, even if the road is a flat area, the road profile determination unit 105 may output the gradient information indicating that the gradient change is negative.

On the other hand, part (B) of FIG. 10 shows a merging road where one lane merges with another lane on the right side of the front of the vehicle 2, and the right lane marking 20R is cut in a portion which is a road on the right side of the front of the lane along which the vehicle 2 is traveling, and in which the lanes merge with each other.

When the vehicle 2 moves straight on such a merging road, the lane marking recognition unit 102 recognizes the right lane marking 20R at the right side of the front of the vehicle 2. In this case, since the width of the lane seemingly decreases gradually toward the travel direction, the right direction change amount $\Delta\theta_R$ calculated by the direction change amount calculation unit 104 may be smaller than the inverted negative pitching determination threshold value $-\theta_p$. For this reason, even if the road is a flat area, the road profile determination unit 105 may output the gradient information indicating that the gradient change is positive.

In this case, the direction of the left lane marking 201, which is not influenced by branching or merging of the lane is almost constant regardless of the elapse of time, but the direction of the right lane marking 20R changes. Such a change reduces the correlation value calculated by the lane marking recognition unit 102 in step S106, so that it is determined that dot sequences which form the road markings are not appropriate.

Accordingly, the lane marking recognition unit 102 executes processing of step S106 to generate a confirmation signal indicating that the dot sequences are not appropriate and outputs the generated confirmation signal to the road profile determination unit 105. In addition, when the confirmation signal is input from the lane marking recognition unit 102, the road profile determination unit 105 may output the gradient information indicating that the road profile is in other conditions. In this way, the road profile determination unit 105 can output the correct gradient information.

The road profile determination unit 105 outputs the set gradient information to the communication interface 106.

The communication interface 106 outputs to the vehicle CAN bus 11 the gradient information input from the road profile determination unit 105.

Next, road profile detection processing performed by the road profile defining apparatus 10 related to the present embodiment will be described.

Figure 11:
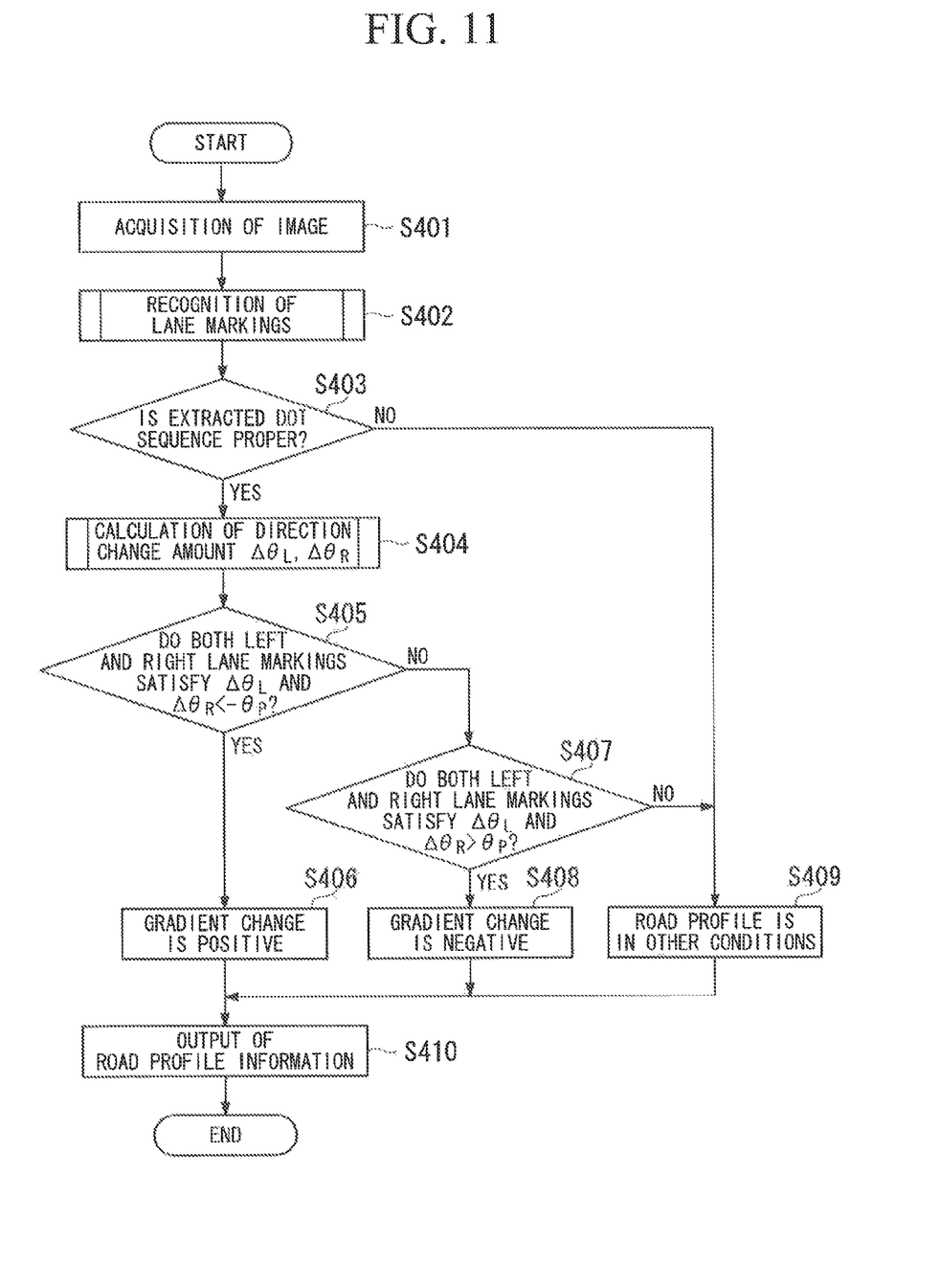
FIG. 11 is a flowchart showing the road profile detection processing performed by the road profile defining apparatus 10 related to the present embodiment.

FIG. 11 is a flowchart showing the road profile detection processing performed by the road profile defining apparatus 10 related to the present embodiment.

(Step S401) The camera interface 101 acquires an image signal input from the front monitoring camera 3 and outputs the acquired image signal to the lane marking recognition unit 102. Then, the process proceeds to step S402.

(Step S402) The lane marking recognition unit 102 recognizes the left lane marking 20L and the right lane marking 20R which separate the lane along which the vehicle 2 is traveling, from the image signal input from the camera interface 101. The lane marking recognition unit 102 recognizes the left lane marking 20L and the right lane marking 20R by performing the lane marking recognition processing shown in steps S101 to S105 of FIG. 3, for example, and extracts the dot sequences which form the left lane marking 20LI and the right lane marking 20RI which have been recognized. In the Hough space peak detection processing (refer to step S103) of the lane marking recognition processing shown in FIG. 3, the lane marking recognition unit 102 performs processing shown in FIG. 4. In the edge pair determination processing (refer to step S104) of the lane marking recognition processing shown in FIG. 3, the lane marking recognition unit 102 performs processing shown in FIG. 5. Then, the process proceeds to step S403.

(Step S403) The lane marking recognition unit 102 determines whether or not the extracted dot sequences are appropriate based on the extracted dot sequences and dot sequences calculated in the past. For example, the lane marking recognition unit 102 determines whether or not the extracted dot sequences are present in both the left and right regions of the screen. When the lane marking recognition unit 102 determines that the extracted dot sequences are appropriate ("Yes" in step S403), the lane marking recognition unit 102 outputs the dot sequences to the lane marking direction calculation unit 103 as dot sequences which form the recognized lane markings 20LI and 20RI. Then, the process proceeds to step S404. When the lane marking recognition unit 102 determines that the extracted dot sequences are not appropriate ("No" in step S403), the lane marking recognition unit 102 generates a confirmation signal indicating that the dot sequences are not appropriate and outputs the generated confirmation signal to the road profile determination unit 105. Then, the process proceeds to step S409.

(Step S404) The lane marking direction calculation unit 103 calculates the direction $\theta_L{'}$ of the distant portion of the left lane marking LI, the direction $\theta_L$ of the near portion of the left lane marking LI, the direction $\theta_R{'}$ of the distant portion of the right lane marking RI, and the direction $\theta_R$ of the near portion of the right lane marking RI based on the dot sequences forming the recognized lane markings 20LI and 20RI which have been input from the lane marking recognition unit 102. The lane marking direction calculation unit 103 outputs the direction $\theta_L'$ of the distant portion of the left lane marking LI, the direction $\theta_L$ of the near portion of the left lane marking LI, the direction $\theta_R'$ of the distant portion of the right lane marking RI, and the direction $\theta_R$ of the near portion of the right lane marking RI, which have been calculated, to the direction change amount calculation unit 104.

The direction change amount calculation unit 104 calculates a difference between the direction $\theta_L'$ of the distant portion of the left lane marking LI and the direction $\theta_L$ of the near portion of the left lane marking LI, which have been input from the lane marking direction calculation unit 103, as the left direction change amount $\Delta\theta_L$. The direction change amount calculation unit 104 calculates a difference between the direction $\theta_R'$ of the distant portion of the right lane marking RI and the direction $\theta_R$ of the near portion of the right lane marking RI, which have been input from the lane marking direction calculation unit 103, as the right direction change amount $\Delta\theta_R$.

The direction change amount calculation unit 104 outputs the calculated left direction change amount $\Delta\theta_L$ and the calculated right direction change amount $\Delta\theta_R$ to the road profile determination unit 105. Then, the process proceeds to step S405.

(Step S405) The road profile determination unit 105 determines whether or not both the left direction change amount $\Delta\theta_L$ and the right direction change amount $\Delta\theta_R$, which have been input from the direction change amount calculation unit 104, are smaller than the threshold value $-\theta_p$ set in advance. When the road profile determination unit 105 determines that both $\Delta\theta_L$ and $\Delta\theta_R$ are smaller than the threshold value $-\theta_p$ ("Yes" in step S405), the process proceeds to step S406. When the road profile determination unit 105 determines that both $\Delta\theta_L$ and $\Delta\theta_R$ are not smaller than the threshold value $-\theta_p$ ("No" in step S405), the process proceeds to step S407.

(Step S406) The road profile determination unit 105 outputs the gradient information indicating that the gradient change is positive. Then, the process proceeds to step S410.

(Step S407) The road profile determination unit 105 determines whether or not both the left direction change amount $\Delta\theta_L$ and the right direction change amount $\Delta\theta_R$, which have been input from the direction change amount calculation unit 104, are larger than the threshold value $\theta_p$ set in advance. When the road profile determination unit 105 determines that both $\Delta\theta_L$ and $\Delta\theta_R$ are larger than the threshold value $\theta_p$ ("Yes" in step S407), the process proceeds to step S408. When the road profile determination unit 105 determines that both $\Delta\theta_L$ and $\Delta\theta_R$ are not larger than the threshold value $\theta_p$ ("No" in step S407), the process proceeds to step S409.

(Step S408) The road profile determination unit 105 outputs the gradient information indicating that the gradient change is negative. Then, the process proceeds to step S410.

(Step S409) The road profile determination unit 105 outputs the gradient information indicating that the road profile is in other conditions. Then, the process proceeds to step S410.

(Step S410) The road profile determination unit 105 outputs the set gradient information to the communication interface 106. The communication interface 106 outputs to the vehicle CAN bus 11 the gradient information input from the road profile determination unit 105. Then, the process ends.

Thus, the road profile defining apparatus 10 according to the present embodiment includes the front monitoring camera 3 (image acquisition unit) which acquires an image, the lane marking recognition unit 102 which extracts from the image the left lane marking 20L (20LI) located at the left end of the lane painted on the road and the right lane marking 20R (20RI) located at the right end of the lane, and the road profile determination unit 105 which outputs the gradient information indicating a gradient change of the road based on the direction of the left lane marking 20L (20LI) and the direction of the right lane marking 20R (20RI).

Therefore, according to the present embodiment, it is possible to detect the directions, which change with the gradient of the road, of the lane markings which separate the left and right sides and to detect the gradient information correctly based on the detected directions of the lane markings.

In addition, in the road profile defining apparatus 10 according to the present embodiment, the road profile determination unit outputs the gradient information based on the amount of change in the direction of the left lane marking 20L (20LI) and the amount of change in the direction of the right lane marking 20R (20RI) according to the distance from the vehicle.

Therefore, according to the present embodiment, it is possible to detect the amount of change in the direction of the left lane marking and the amount of change in the direction of the right lane marking, which are caused by the gradient, and to detect the gradient information correctly based on the detected amounts of change in the directions of the lane markings.

A part of the road profile defining apparatus 10 according to the above-mentioned embodiments, such as the lane marking recognition unit 102, the lane marking direction calculation unit 103, and the direction change amount calculation unit 104, may be embodied by a computer. In this case, the various units may be embodied by recording a program for performing the control functions in a computer-readable recording medium and by causing a computer system to read and execute the program recorded in the recording medium. Here, the "computer system" is built in the road profile defining apparatus and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

In addition, part or all of the road profile defining apparatus according to the above-mentioned embodiments may be embodied as an integrated circuit such as an LSI (Large Scale Integration). The functional blocks of the road profile defining apparatus may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While an embodiment of the invention has been described in detail with reference to the drawings, practical configurations are not limited to the above-described embodiment, and design modifications can be made without departing from the scope of this invention.

What is claimed is:

1. A road profile defining apparatus, comprising:
    an image acquisition unit, comprising hardware, configured to acquire an image;
    a lane marking recognition unit configured to extract from the image a left lane marking located at a left end of one lane painted on a road and a right lane marking located at a right end of the lane; and
    a road profile determination unit configured to output gradient information indicating a gradient change of the road based on the amount of change in a direction of the left lane marking and the amount of change in a direction of the right lane marking according to a distance from a vehicle.

2. A road profile defining method in a road profile defining apparatus including an image acquisition unit configured to acquire an image, the road profile defining method comprising:
    extracting from the image a left lane marking located at a left end of one lane painted on a road and a right lane marking located at a right end of the lane; and
    outputting gradient information indicating a gradient change of the road based on the amount of change in a direction of the left lane marking and the amount of change in a direction of the right lane marking according to a distance from a vehicle.

3. A non-transitory computer-readable storage medium comprising a road profile defining program causing a computer in a road profile defining apparatus including an image acquisition unit configured to acquire an image to execute:
    extracting from the image a left lane marking located at a left end of one lane painted on a road and a right lane marking located at a right end of the lane; and
    outputting gradient information indicating a gradient change of the road based on the amount of change in a direction of the left lane marking and the amount of change in a direction of the right lane marking according to a distance from a vehicle.

* * * * *